United States Patent
Lin

(10) Patent No.: US 11,537,332 B2
(45) Date of Patent: Dec. 27, 2022

(54) IMAGE FORMING APPARATUS AND CONTROL METHOD FOR EXCELLENT USABILITY FOR USERS USING PRINT DATA

(71) Applicant: CANON KABUSHIKI KAISHA, Tokyo (JP)

(72) Inventor: Zhi Lin, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/374,794

(22) Filed: Jul. 13, 2021

(65) Prior Publication Data

US 2021/0342104 A1 Nov. 4, 2021

Related U.S. Application Data

(63) Continuation of application No. 15/948,633, filed on Apr. 9, 2018, now Pat. No. 11,093,181.

(30) Foreign Application Priority Data

Apr. 17, 2017 (JP) .............................. JP2017-081634

(51) Int. Cl.
*G06F 3/12* (2006.01)
*H04N 1/00* (2006.01)
*G06F 3/0482* (2013.01)

(52) U.S. Cl.
CPC .......... *G06F 3/1204* (2013.01); *G06F 3/1207* (2013.01); *G06F 3/1238* (2013.01);
(Continued)

(58) Field of Classification Search
CPC .... G06F 3/0482; G06F 3/1203; G06F 3/1207; G06F 3/1222; G06F 3/1238;
(Continued)

(56) References Cited

U.S. PATENT DOCUMENTS

| 2008/0074689 | A1* | 3/2008 | Yamada | ............. H04N 1/32368 |
| | | | | 358/1.13 |
| 2013/0208292 | A1* | 8/2013 | Akari | ...................... G06F 3/121 |
| | | | | 358/1.13 |

FOREIGN PATENT DOCUMENTS

| JP | 2016006667 A | 1/2016 |
| KR | 10-2016-0001530 A | 1/2016 |
| KR | 10-2017-0007178 A | 1/2017 |

* cited by examiner

*Primary Examiner* — Kent Yip
(74) *Attorney, Agent, or Firm* — Canon U.S.A., Inc. IP Division

(57) ABSTRACT

An image forming apparatus using an image forming unit configured to form an image on a sheet and a display unit configured to display information includes at least one controller, the at least one controller configured to function as a management unit configured to manage print data in association with user information, the management unit configured to discriminably manage information about previously-printed print data and information about unprinted print data, and a unit configured to display on the display unit a user selection screen on which a plurality of selection objects corresponding to the user information is arrangeable and on which the selection object corresponding to the user information associated with the unprinted print data is arranged while no selection object corresponding to the user information associated with the previously-printed print data but not associated with the unprinted print data is arranged.

11 Claims, 18 Drawing Sheets

(52) U.S. Cl.
CPC .......... G06F 3/1259 (2013.01); G06F 3/1267 (2013.01); H04N 1/00411 (2013.01); *G06F 3/0482* (2013.01); *G06F 3/1222* (2013.01)

(58) Field of Classification Search
CPC ...... G06F 3/1259; G06F 3/126; G06F 3/1267; G06F 3/1273; H04N 1/00411
USPC ....................................................... 358/1.15
See application file for complete search history.

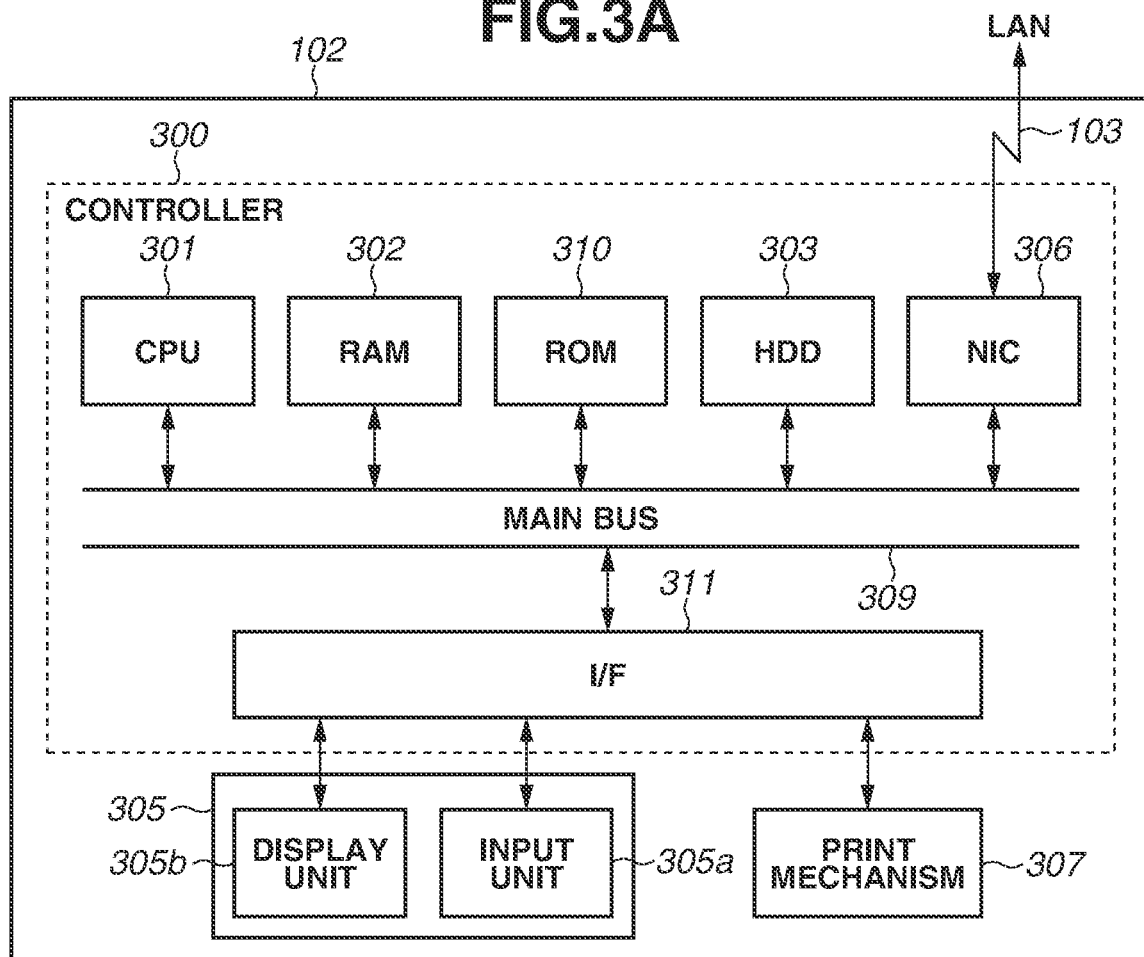
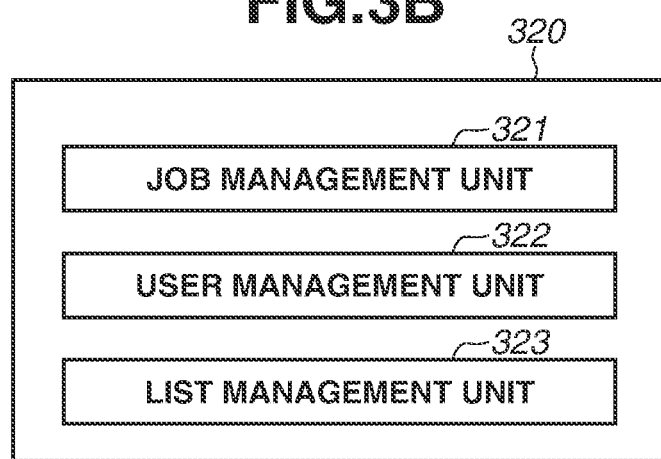

| No. | USER NAME | PASSWORD |
|---|---|---|
| 0001 | Administrator | **** |
| 0002 | edward | **** |
| 0003 | goto | **** |
| 0004 | hayashi | **** |
| 0005 | Ito | **** |
| 0006 | ivy | **** |
| 0007 | kaneko | **** |
| ... | ... | ... |

FIG.6

| No. (601) | JOB NAME (602) | USER NAME (603) | PRINT STATUS (604) | ... |
|---|---|---|---|---|
| 0001 | MEETING MATERIALS.ppt | edward | UNPRINTED | ... |
| 0002 | QUOTATION.doc | edward | PREVIOUSLY-PRINTED | ... |
| 0003 | SCHEDULE.xlsx | hayashi | UNPRINTED | ... |
| 0004 | MINUTES.txt | goto | PREVIOUSLY-PRINTED | ... |
| 0005 | MEMO.pdf | ito | UNPRINTED | ... |
| ... | ... | ... | ... | ... |

| USER NAME | NUMBER OF UNPRINTED JOBS | NUMBER OF PREVIOUSLY-PRINTED JOBS | TOTAL NUMBER OF JOBS |
|---|---|---|---|
| Administrator | 0 | 0 | 0 |
| edward | 2 | 2 | 4 |
| goto | 3 | 7 | 10 |
| hayashi | 5 | 0 | 5 |
| ito | 0 | 8 | 8 |
| ... | ... | ... | ... |

| USER NAME | NUMBER OF UNPRINTED JOBS | NUMBER OF PREVIOUSLY-PRINTED JOBS | TOTAL NUMBER OF JOBS |
|---|---|---|---|
| goto | 3 | 7 | 10 |
| ito | 0 | 8 | 8 |
| hayashi | 5 | 0 | 5 |
| edward | 2 | 2 | 4 |
| Administrator | 0 | 0 | 0 |
| ... | ... | ... | ... |

| USER NAME | NUMBER OF UNPRINTED JOBS | NUMBER OF PREVIOUSLY-PRINTED JOBS | TOTAL NUMBER OF JOBS |
|---|---|---|---|
| hayashi | 5 | 0 | 5 |
| goto | 3 | 7 | 10 |
| edward | 2 | 2 | 4 |
| ito | 0 | 8 | 8 |
| Administrator | 0 | 0 | 0 |
| ... | ... | ... | ... |

| USER NAME | NUMBER OF UNPRINTED JOBS | NUMBER OF PREVIOUSLY-PRINTED JOBS | TOTAL NUMBER OF JOBS |
|---|---|---|---|
| ito | 0 | 8 | 8 |
| goto | 3 | 7 | 10 |
| edward | 2 | 2 | 4 |
| hayashi | 5 | 0 | 5 |
| Administrator | 0 | 0 | 0 |
| ... | ... | ... | ... |

SELECT BUTTON TO LOG IN.
BE SURE TO LOG OUT AFTER END OF OPERATION.

ALL ▼ | BY NAME ▼
BY NUMBER OF JOBS
BY NUMBER OF JOBS (UNPRINTED)
BY NUMBER OF JOBS (PREVIOUSLY-PRINTED)

administra...

goto | hayashi

SELECT BUTTON TO LOG IN.
BE SURE TO LOG OUT AFTER END OF OPERATION.

ALL ▼ | BY NUMBER OF JOBS goto | ito hayashi | edward

IMAGE FORMING APPARATUS AND CONTROL METHOD FOR EXCELLENT USABILITY FOR USERS USING PRINT DATA

CROSS-REFERENCE TO RELATED APPLICATIONS

This application is a Continuation of U.S. patent application Ser. No. 15/948,633, filed on Apr. 9, 2018, which claims the benefit of Japanese Patent Application No. 2017-081634, filed Apr. 17, 2017, each of which is hereby incorporated by reference herein in its entirety.

BACKGROUND

Field of the Disclosure

The present disclosure relates to an image forming apparatus and a method of controlling the same. The image forming apparatus is used as a facsimile machine, printer, copying machine, multi-function peripheral, etc.

Description of the Related Art

Image forming apparatuses such as printers are conventionally known as apparatuses for forming (printing) images on sheets. Further, image forming apparatuses having a user authentication function (login function) are popularly used in recent years.

Japanese Patent Application Laid-Open No. 2012-254618 discusses an image forming apparatus to which a user can log in by selecting a user icon displayed on a screen. The user logs in to the image forming apparatus to display a list of print jobs associated with the logged-in user among print jobs stored in the image forming apparatus. Then, the user can select a print job to be printed from the displayed print jobs and give an instruction to print the selected print job.

Further, the image forming apparatus discussed in Japanese Patent Application Laid-Open No. 2012-254618 hides a user icon of a user if no print job associated with the user is stored. In this way, the user icons of the users having an associated print job stored in the image forming apparatus become easy to recognize.

Meanwhile, the image forming apparatus discussed in Japanese Patent Application Laid-Open No. 2012-254618 is configured to automatically delete a print job after the printing of the print job is completed. There can be, however, a user who desires to reprint after the printing is completed, so it is desirable to include a function of not deleting but retaining previously-printed print jobs. In the case of not deleting but retaining previously-printed print jobs, however, unprinted jobs and previously-printed jobs are mixedly associated with the user. Thus, if the apparatus narrows down the user icons based solely on the presence/absence of a user job, the icons of the users having previously-printed print jobs and the icons of the users having unprinted print jobs can mixedly be displayed. Thus, the user attempting to log in to the apparatus needs to search for the user icon of the user from many candidates, and this is inconvenient for the user.

For example, the user attempting to log in to the apparatus to print an unprinted print job tries to find the user icon of the user with ease by first filtering the user icons using a condition "users having print jobs". However, the users having print jobs include users having previously-printed print jobs, so many candidate user icons are displayed. Thus, it can take time for the user to find the user icon of the user.

SUMMARY

The present disclosure is directed to an image forming apparatus with excellent usability for users using print data.

According to an aspect of the present disclosure, an image forming apparatus using an image forming unit configured to form an image on a sheet and a display unit configured to display information includes at least one controller having a processor that executes programs stored in a memory, the at least one controller configured to function as a management unit configured to manage print data in association with user information, the management unit configured to discriminably manage information about previously-printed print data and information about unprinted print data, and a unit configured to display on the display unit a user selection screen on which a plurality of selection objects corresponding to the user information is arrangeable and on which the selection object corresponding to the user information associated with the unprinted print data is arranged while no selection object corresponding to the user information associated with the previously-printed print data but not associated with the unprinted print data is arranged.

Further features of the present disclosure will become apparent from the following description of exemplary embodiments with reference to the attached drawings.

BRIEF DESCRIPTION OF THE DRAWINGS

FIG. 3A is a block diagram illustrating a hardware configuration of an image forming apparatus and FIG. 3B is a diagram illustrating a software configuration of the image forming apparatus.

FIG. 4 is a diagram illustrating a configuration of a user database.

FIG. 6 is a diagram illustrating a bibliographic information database.

FIG. 11A is a diagram illustrating the configuration of an aggregated database and FIG. 11B is a diagram illustrating a sort by the number of print jobs.

FIG. 12A is a diagram illustrating a sort by the number of unprinted jobs and FIG. 12B is a diagram illustrating a sort by the number of previously-printed jobs.

FIG. 13A is a diagram illustrating a sort tab and FIG. 13B is a diagram illustrating a result of a sort by the number of print jobs.

FIG. 14A is a diagram illustrating a result of a sort by the number of unprinted jobs and FIG. 14B is a diagram illustrating a result of a sort by the number of previously-printed jobs.

DESCRIPTION OF THE EMBODIMENTS

Various exemplary embodiments of the present disclosure will be described below. Configurations for implementing the present disclosure are not limited to those described in the exemplary embodiments. The configurations described in the exemplary embodiments can be replaced partially or entirely by an equivalent within a range that an advantage of the present disclosure is produced.

In a first exemplary embodiment, a print system (image forming system) will be described as an example in which a personal computer (PC) (information processing apparatus) transmits print data and a printer (image forming apparatus) receives and prints the print data.

[Print System]

Figure 1A:
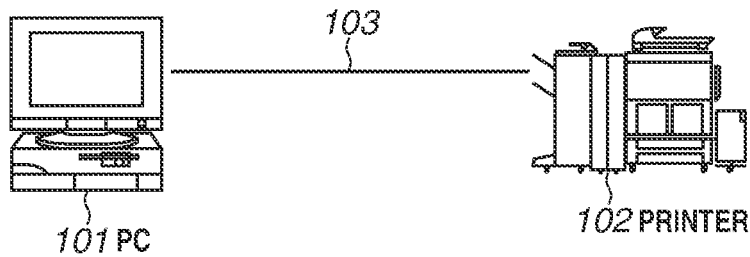
FIG. 1A is a diagram illustrating a configuration of an image forming system and FIG. 1B is a diagram illustrating a process performed by the image forming system.

FIG. 1A is a diagram illustrating a configuration of the image forming system. A print system 100 includes a PC 101 and a printer 102. The PC 101 and the printer 102 are communicably connected to each other via a local area network (LAN) 103.

In the print system 100, print data (print job) output by the PC 101 is downloaded and printed by the printer 102.

The PC 101 is a commonly-used computer which functions as an external device with respect to a printing apparatus.

The PC 101 is capable of outputting print data based on a document file or image file.

The printer 102 is the image forming apparatus which performs printing on sheets (recording materials, paper) based on print data. The printer 102 is capable of receiving print data. The printer 102 is capable of performing printing based on print data. The printer 102 can be a multifunction peripheral (multifunction printer) (MFP) or single function printer (SFP). Further, the printer 102 can be an electrophotographic printer or inkjet printer.

[Image Forming Sequence]

Figure 1B:
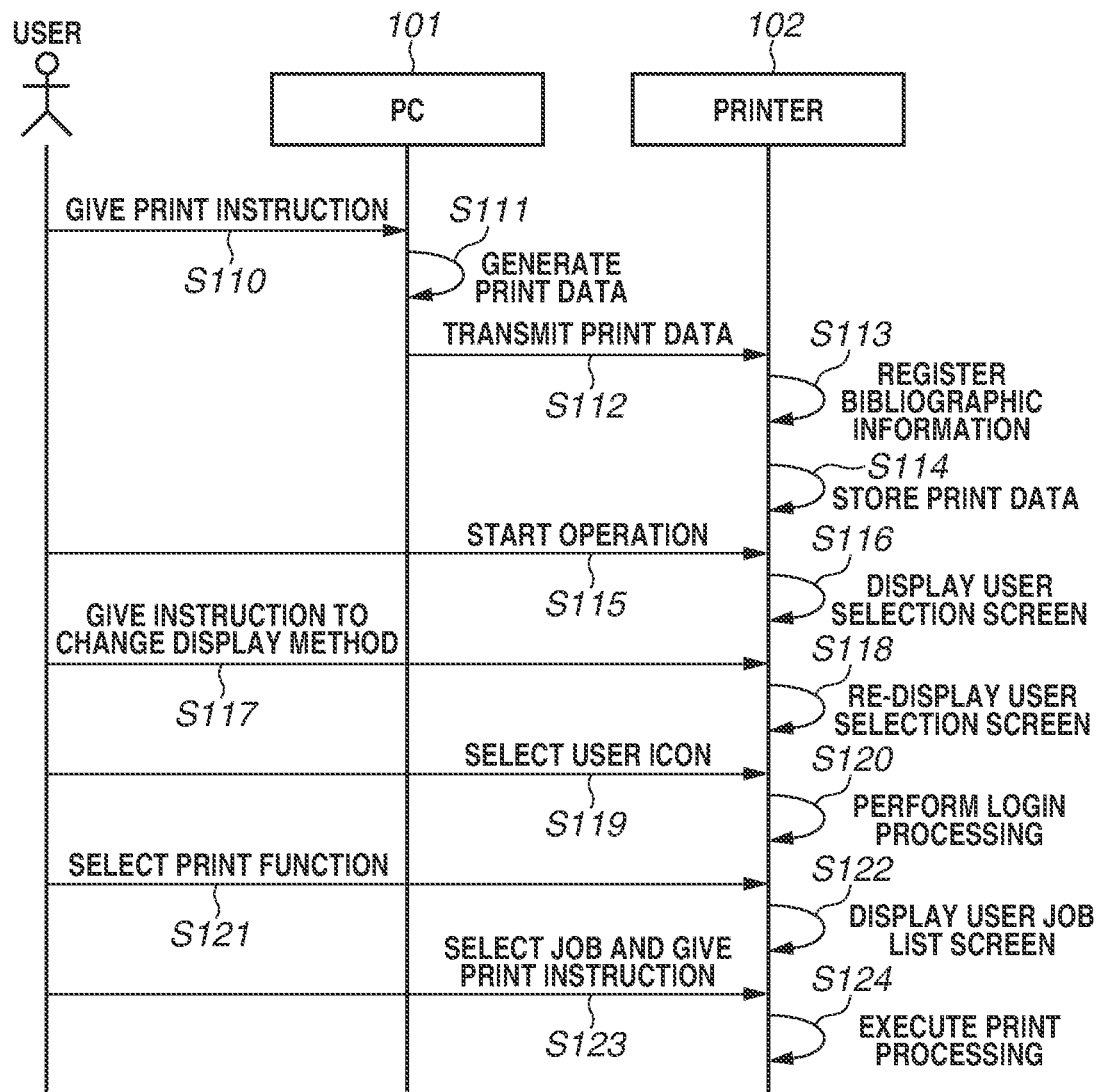

Next, an entire sequence of printing using the print system 100 will be described below. FIG. 1B is a diagram illustrating a process executed by the image forming system.

Figure 5A:
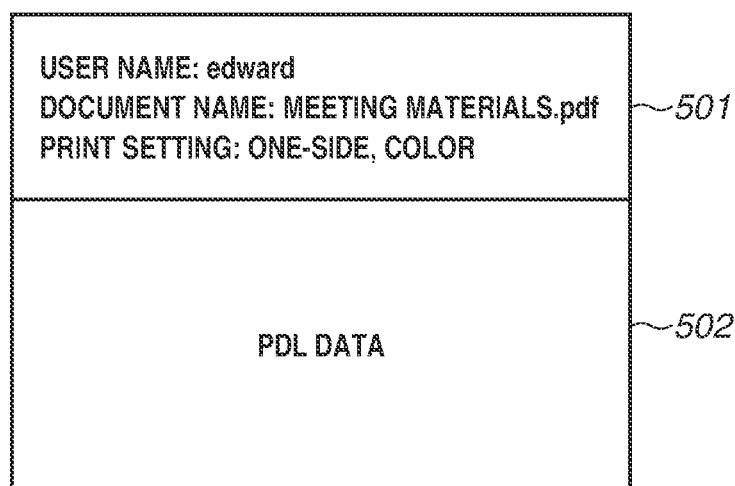
FIG. 5A is a diagram illustrating a configuration of page description language (PDL) data and FIG. 5B is a diagram illustrating a data configuration of a printer storage area.
Figure 5B:
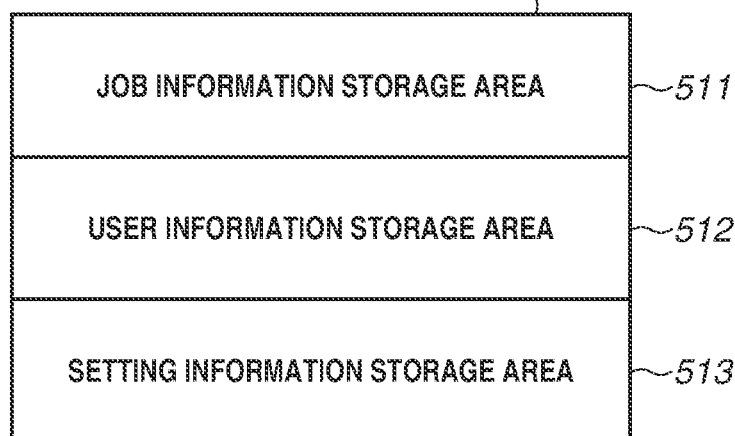

To start the image forming sequence, first, the user performs login processing to log in to the PC 101. In the login processing, the user inputs user information such as a user account name and authentication information such as a password. The PC 101 performs user login processing based on the user-input information. The logged-in user designates a document to be printed and gives an instruction to execute a printer driver. When the printer driver is activated, then in step S110, the user designates a transmission destination of print data and print settings and then gives a print instruction. In the present exemplary embodiment, the printer 102 is designated as the transmission destination of the print data. In step S111, the PC 101 generates print data based on the designated document, print settings, user information about the logged-in user, etc. The generated print data has a configuration as illustrated in FIG. 5A. FIG. 5A is a diagram illustrating a configuration of page description language (PDL) data. When the print data is generated, then in step S112, the PC 101 transmits the print data to the printer 102. When the print data is transmitted, the printer 102 performs processing to receive the print data. Then, in step S113, the printer 102 registers bibliographic information about the received print data in a bibliographic information database (DB). The bibliographic information DB contains information as illustrated in FIG. 5B. FIG. 5B is a diagram illustrating the configuration of the bibliographic information DB. In step S114, as the bibliographic information is registered, the printer 102 stores the print data in association with an account allowed to log in to the printer 102 and waits for a user instruction. The account is managed in a user DB illustrated in FIG. 4. FIG. 4 illustrates the configuration of the user DB.

Then, in step S115, the user starts operating the printer 102. In step S116, if the printer 102 detects a user operation, the printer 102 activates a display to display a login screen (user selection screen). In step S117, the user gives an instruction to change a display method if the user desires to change the display method of the user selection screen. In step S118, the printer 102 re-displays the user selection screen by the user-instructed method. Then, in step S119, the user selects a user icon (selection object) corresponding to the account of the user. In step S120, the printer 102 performs login processing using the account corresponding to the selected user icon. In the login processing, the user may be prompted to input a password. If the login is successful, the printer 102 displays a menu screen on which various functions are selectable. Then, in step S121, the user selects a print function. In step S122, if the print function is selected, the printer 102 displays a user job list screen. On the user job list screen is arranged identification information about print data associated with the logged-in user based on the bibliographic information. In step S123, when the user selects a job to be printed from the job list and gives a print instruction, then in step S124, the printer 102 performs print processing based on the selected print job.

[PC Hardware Configuration]

Figure 2A:
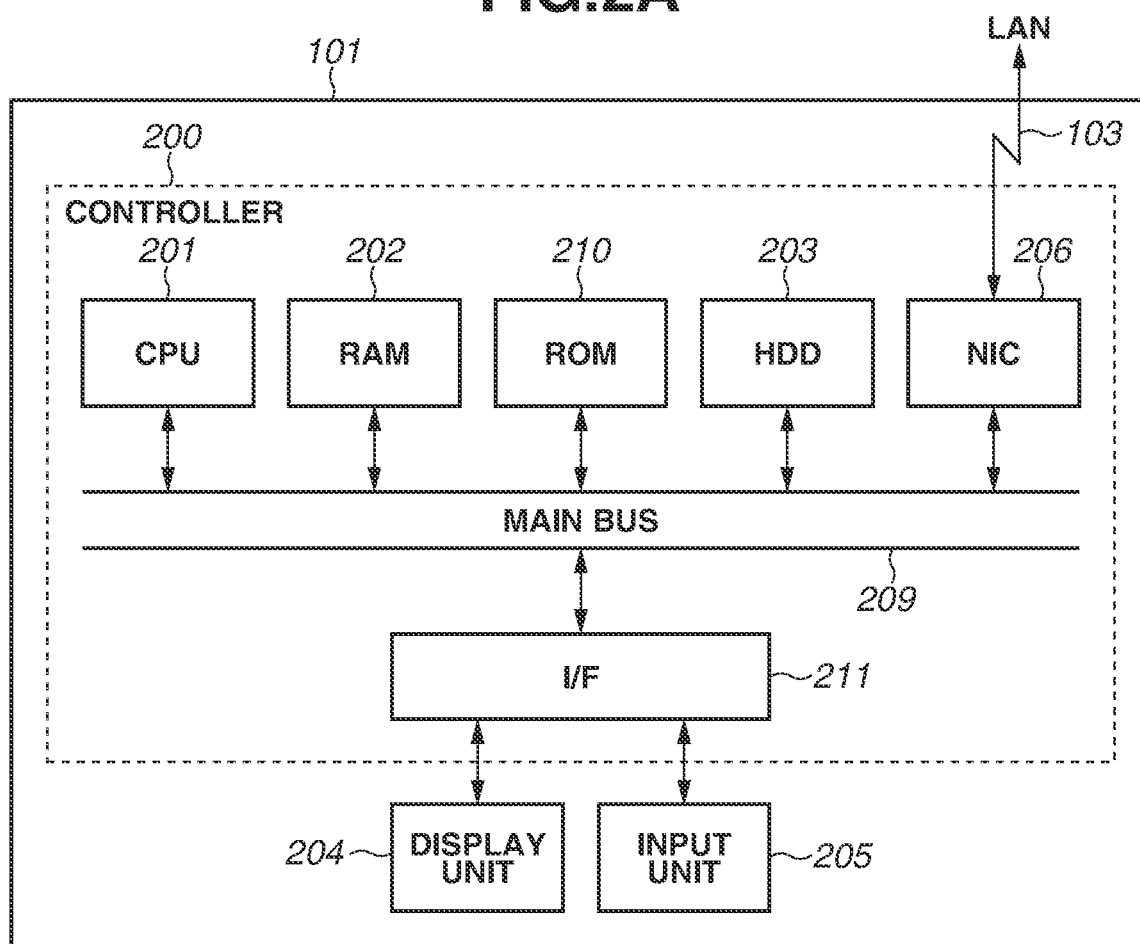
FIG. 2A is a block diagram illustrating a hardware configuration of an information processing apparatus and FIG. 2B is a diagram illustrating a software configuration of the information processing apparatus.

The hardware configuration of the PC 101 will be described below. FIG. 2A is a block diagram illustrating the hardware configuration of the information processing apparatus. As illustrated in FIG. 2A, the PC 101 includes a controller 200, a display unit 204, and an input unit 205.

The display unit 204 is a device such as a display which displays information to the user. The input unit 205 is a user interface such as a keyboard and a mouse for inputting the contents of user instructions.

The controller 200 is a control device which performs various types of control. The controller 200 includes a central processing unit (CPU) 201, a random-access memory (RAM) 202, a read-only memory (ROM) 210, a hard disk drive (HDD) 203, a network interface card (NIC) 206, and an interface (I/F) 211. The components of the controller 200 are communicably connected to each other via a main bus 209. The controller 200 can include one board or a plurality of boards.

The CPU 201 is a central processing unit (processor) which performs computation for various types of control. The RAM 202 is a system work memory used as a work area of the CPU 201. Further, the RAM 202 functions as an image memory for temporarily storing print data and image data. The ROM 210 is a memory which stores various programs including a system boot program. The HDD 203 is a storage unit for storing system software and various types of data such as print data and image data. The HDD 203 is capable of storing PDL data. The NIC 206 is a network interface card for input and output of information to and from external devices via the LAN 103. The I/F 211 is an interface for input and output of information to and from the display unit 204 and the input unit 205. Alternatively, separate interfaces can be provided respectively to the display unit 204 and the input unit 205.

[PC Software Configuration]

Figure 2B:
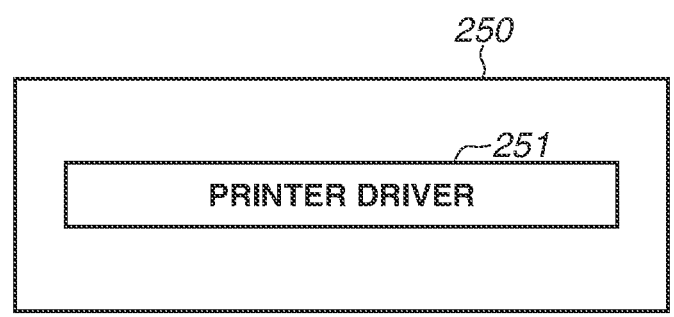

The software configuration of the PC 101 will be described below. FIG. 2B is a block diagram illustrating the software configuration of the information processing apparatus. As illustrated in FIG. 2B, the PC 101 includes a printer driver 251 as executable software 250.

The printer driver 251 generates print data 500 in PDL data format based on document data (document). The PDL data is data which is described in PDL and interpretable by the printer 102.

As illustrated in FIG. 5A, the print data 500 contains a header portion 501 and a body portion 502. The header portion 501 stores user information such as the user name, document information such as the document name, and setting information such as print settings (one-side/two-side, color/monochrome). The body portion 502 stores PDL commands. While the user name of the user having logged in to the PC 101 is used as user identification information in the present exemplary embodiment, any other information can be used as user identification (ID).

[Printer Hardware Configuration]

Next, the configuration of the printer 102 will be described below. FIG. 3A is a block diagram illustrating the hardware configuration of the image forming apparatus. As illustrated in FIG. 3A, the printer 102 includes a controller 300 (control unit), an operation panel 305, and a print mechanism 307.

The print mechanism 307 is a print mechanism (print engine) which is a mechanical mechanism for forming images on sheets. The print mechanism 307 functions as an image forming unit.

The operation panel 305 (operation unit) is a reception unit and a user interface for notifying the user of information and receiving user instructions. The operation panel 305 includes an input unit 305a (operation unit) for user input, such as an input key and a touch screen, and a notification unit 305b (display unit, informing unit) for notifying the user of information with light and sound, such as a liquid crystal panel and a speaker. The operation panel 305 outputs user-input information to the controller 300 and receives notification information to the user from the controller 300.

The controller 300 is a control unit which comprehensively controls the entire printer 102 based on a program. The controller 300 includes a CPU 301, a HDD 303, a RAM 302, a ROM 310, and an I/F 311. The components of the controller 300 are communicably connected to each other via a main bus 309. The controller 300 can include one board or a plurality of boards.

The CPU 301 is a central processing unit (processor) which performs computation for various types of control. The HDD 303 is a storage unit for storing system software and various types of data such as print data and image data. The HDD 303 is capable of storing PDL data. The RAM 302 is a system work memory used as a work area of the CPU 301. Further, the RAM 302 functions as an image memory for temporarily storing print data and image data. The ROM 310 is a memory which stores various programs including a system boot program. An NIC 306 is a communication interface for input and output of information to and from external devices via the LAN 103. The I/F 311 is an interface for input and output of information to and from the print mechanism 307 and the operation panel 305. Alternatively, separate interfaces can be provided respectively to the print mechanism 307 and the operation panel 305.

[Printer Software Configuration]

The software configuration of the printer 102 will be described below. FIG. 3B is a diagram illustrating the software configuration of the image forming apparatus.

The controller 300 functions as various functional units 320 by executing various programs. Specifically, a program stored in the ROM 310 or the HDD 303 is loaded into the RAM 302 and executed by the CPU 301 to realize each function. As illustrated in FIG. 3B, the controller 300 includes the functions as a job management unit 321, a user management unit 322, and a list management unit 323. The program processing for realizing each functional unit can partially or entirely be executed by an external device connected to the printer 102, which is known as a cloud configuration.

The job management unit 321 is a functional unit which manages print jobs. The job management unit 321 registers, edits, and deletes information about each piece of print data on a bibliographic information database 600. FIG. 6 is a diagram illustrating the bibliographic information database 600. As illustrated in FIG. 6, the bibliographic information database 600 includes a job number column 601, a job name column 602, a user name column 603, a print status column 604, and other information columns. The job number column 601 specifies serial numbers for managing job information. The job name column 602 specifies the document names of print data. The user name column 603 specifies the owner names (transmitter names) of the print data. The print status column 604 specifies flag information "previously-printed" or "unprinted". The flag information "previously-printed" indicates that printing using the print data is previously performed, whereas the flag information "unprinted" indicates that printing using the print data is not previously performed. Further, the bibliographic information database 600 manages information such as the print settings and submission time/date.

The user management unit 322 is a functional unit which manages information about users of the printer 102. The user management unit 322 registers, edits, and deletes information about the users on a user database 400. As illustrated in FIG. 4, the user database 400 includes a user number 401, a user name 402, and a password 403. The user number 401 is a serial number for managing the user information. The user name 402 is a user account name which is used to log in. In the present exemplary embodiment, the owner name of print data is used as the user account. A user account name which is different from the owner name of the print data can be used if the owner name of the print data can be associated with the user account. The password 403 is a password which is required to be input to log in to the user account. The password can be set at the time of generating the user account or editing the user information. The password can be unset if there are no security risks.

In the present exemplary embodiment, the user database 400 is registered in advance by an administrator user. The user database 400 can be downloaded from a management server (not illustrated) to be registered.

The list management unit 323 is a functional unit for controlling the display contents of the user icons. Details thereof will be described below.

Next, the configuration of data stored in the storage area of the printer 102 such as the HDD 303 and the ROM 310 will be described below. FIG. 5B illustrates the data configuration in the storage area of the image forming apparatus. An information storage area 510 is a functional unit which manages information used in the printer 102. As illustrated in FIG. 5B, the information storage area 510 includes a job information storage area 511, a user information storage area 512, and a setting information storage area 513. The job information storage area 511 is a data area for managing the print data 500, the bibliographic information database 600, etc. and is mainly used by the job management unit 321. The user information storage area 512 is an area for managing the user database 400, etc. and is mainly used by the user management unit 322. The setting information storage area 513 is a data area for managing setting values for use in various types of control and is used by various control programs. In the present exemplary embodiment, setting values such as top screen login settings and deletion-after-printing settings are stored.

[Display Screen]

Figure 7A:
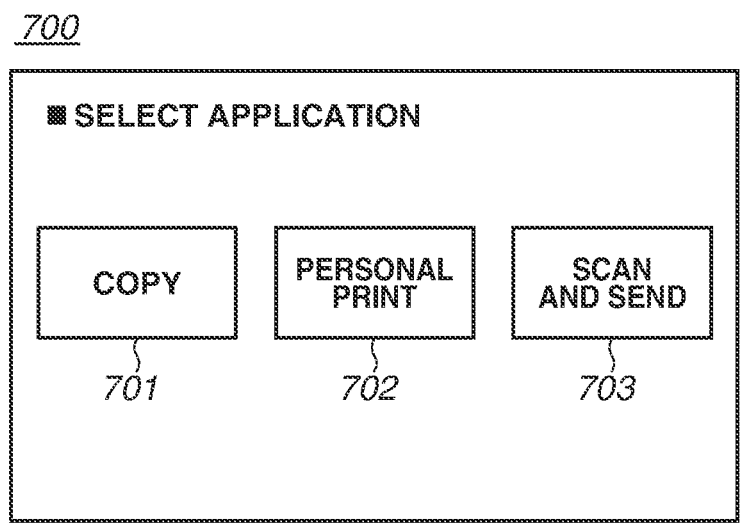
FIG. 7A is a diagram illustrating a menu screen.
Figure 7B:
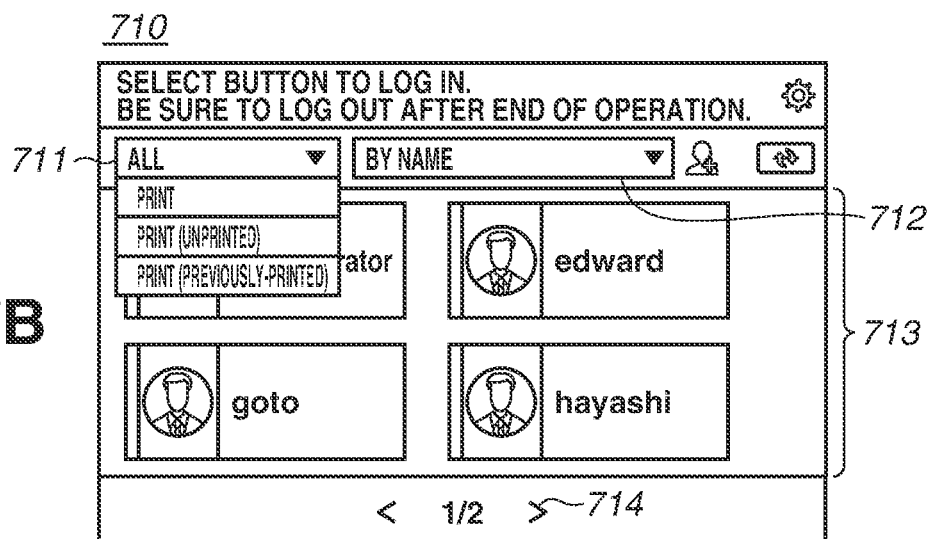
FIG. 7B is a diagram illustrating a user selection screen.
Figure 7C:
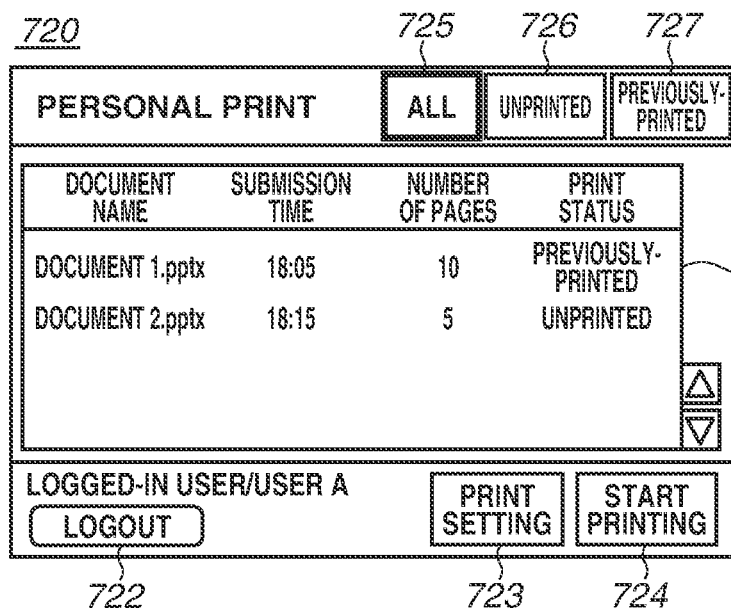
FIG. 7C is a diagram illustrating a print job selection screen.

Next, a screen displayed on the display unit 305b of the operation panel 305 will be described below. FIG. 7A is a diagram illustrating a menu screen. FIG. 7B is a diagram illustrating a user selection screen. FIG. 7C is a diagram illustrating a print job selection screen.

As illustrated in FIG. 7A, the display unit 305b is capable of displaying a menu screen 700. The menu screen 700 includes a copy button 701, a personal print button 702, and a scan-and-send button 703.

The copy button 701 is a button object for using a copy function of the printer 102. If the copy button 701 is selected, the controller 300 displays a copy instruction screen (not illustrated) on the display unit 305b.

The scan-and-send button 703 is a button object for using the copy function of the printer 102. If the scan-and-send button 703 is selected, the controller 300 displays a scan-and-send instruction screen (not illustrated) on the display unit 305b.

The personal print button 702 is a button object for using a personal print function of the printer 102. If the personal print button 702 is selected, the controller 300 displays a personal print instruction screen (print job selection screen) 720 on the display unit 305b.

The personal print instruction screen 720 is a screen for inputting an instruction to print the print data stored in the HDD 303. The instruction screen 720 includes a job list 721, a logout button 722, a print setting button 723, a print start button 724, an all button 725, an unprinted button 726, and a previously-printed button 727. The job list 721 is a list of information about print-instructable jobs among the print jobs for which print data is stored in the HDD 303.

The job list 721 includes identification information about each print job, such as the document name, submission time information, number-of-pages information, and print status information. The user can select one or more print jobs to operate from the job list 721. The jobs displayed on the job list 721 are the jobs registered in the bibliographic information database 600. In the present exemplary embodiment, especially, the print jobs associated with the logged-in user of the printer 102 are displayed.

The logout button 722 is a button for logging out of the printer 102. If the logout button 722 is selected, the logged-in user (e.g., user A) logs out, and the printer 102 is changed to the state in which nobody is logged in to the printer 102.

The print setting button 723 is a button for setting print settings with respect to the print job selected from the job list 721. If the print setting button 723 is selected, the controller 300 displays a print setting screen (not illustrated) on the display unit 305b.

The print start button 724 is a button for giving an instruction to execute printing of the selected job. If the print start button 724 is selected, the controller 300 causes the print mechanism 307 to execute image forming based on the selected job.

The all button 725 is a button for displaying both the jobs of the print status "previously-printed" and the jobs of the print status "unprinted" among the print jobs associated with the logged-in user. The instruction screen 720 indicates the state in which the all button 725 is selected.

The unprinted button 726 is a button for displaying the jobs of the print status "unprinted" among the print jobs associated with the logged-in user.

The previously-printed button 727 is a button for displaying the jobs of the print status "previously-printed" among the print jobs associated with the logged-in user Meanwhile, the user needs to log in to the printer 102 in advance in order to display the jobs associated with the logged-in user on the instruction screen 720. The user login is performed using a user selection screen 710.

The user selection screen 710 is a screen for selecting an account to log in to the printer 102. The user selection screen 710 includes a filter tab 711, a sort tab 712, a display area 713, and a next-page button 714.

In the display area 713 is arranged and displayed a plurality of user icons corresponding to the accounts allowed to log in to the printer 102 (a plurality of arrangements is possible). If one user icon is selected in the display area 713, the user can log in to the printer 102 using the selected account. Alternatively, after a user account is selected, authentication information such as a password may be requested to allow the user account to log in only if the authentication information matches.

The filter tab 711 is a tab for changing the user icons to be displayed on the display area 713. From the filter tab 711 an all filter, a print filter, a print (unprinted) filter, or a print (previously-printed) filter is selectable. If the all filter is selected, the icons of all the users managed by the user database are to be displayed. If the print filter is selected, the icons of the users having associated print data stored in the HDD 303, i.e., the icons of the users having an associated job registered in the bibliographic information database 600, are to be displayed. If the print (unprinted) filter is selected, the icons of the users having a job of the print status "unprinted" registered as an associated job are to be displayed among the jobs registered in the bibliographic information database 600. If the print (previously-printed) filter is selected, the icons of the users having a job of the print status "previously-printed" registered as an associated job are to be displayed among the jobs registered in the bibliographic information database 600.

The sort tab 712 is a tab for changing the display order (arrangement layout) of the user icons displayed in the display area 713. Detailed description thereof is omitted in the present exemplary embodiment.

The next-page button 714 is a button for changing the displayed user icons among the user icons to be displayed. If the next-page button 714 is selected, for example, the user icons displayed on the display area 713 are changed from "administrator", "edward", "goto", and "hayashi" to "ito", "ivy", and "kaneko".

[Icon Filter]

Details of the icon filters which become usable when the filter tab 711 is selected will be described below.

Figure 8A:
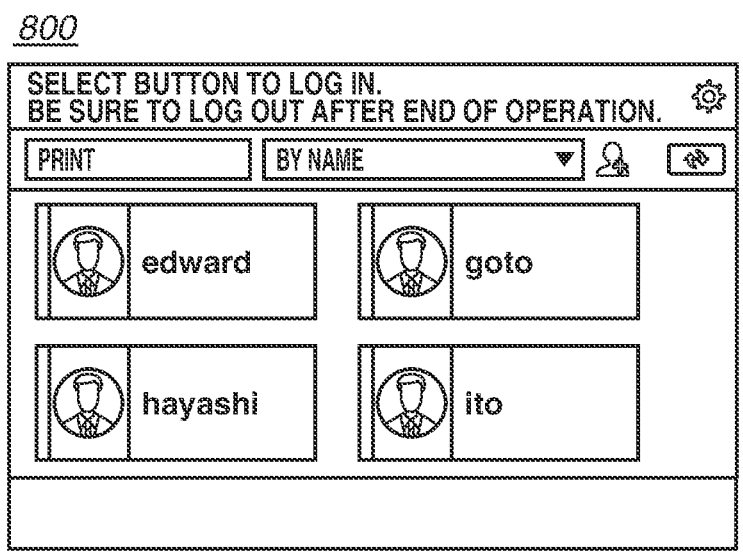
FIG. 8A is a diagram illustrating a print filter result.

FIG. 8A is a diagram illustrating a print filter result. In the print filter, the icons of the users having an associated job registered in the bibliographic information database 600 are displayed. The users having a job registered in the bibliographic information database 600 are "edward", "hayashi", "goto", and "ito". Thus, the display area 713 displays the user icons "edward", "hayashi", "goto", and "ito" on a print filter screen 800.

Figure 8B:
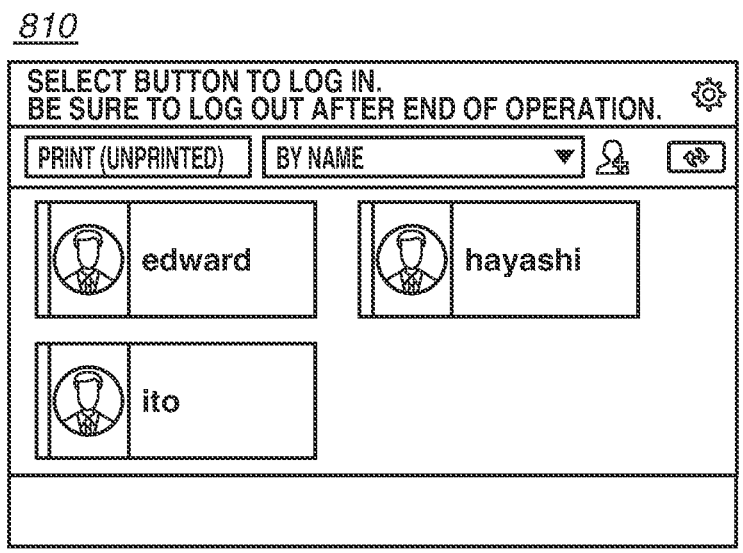
FIG. 8B is a diagram illustrating an unprinted filter result.

FIG. 8B is a diagram illustrating an unprinted filter result. In the unprinted filter, the icons of the users having a job of the status "unprinted" registered in the bibliographic information database 600 are displayed. The users having an "unprinted" job registered in the bibliographic information database 600 are "edward", "hayashi", and "ito". Thus, the display area 713 displays the user icons "edward", "hayashi", and "ito" on an unprinted filter screen 810.

Figure 8C:
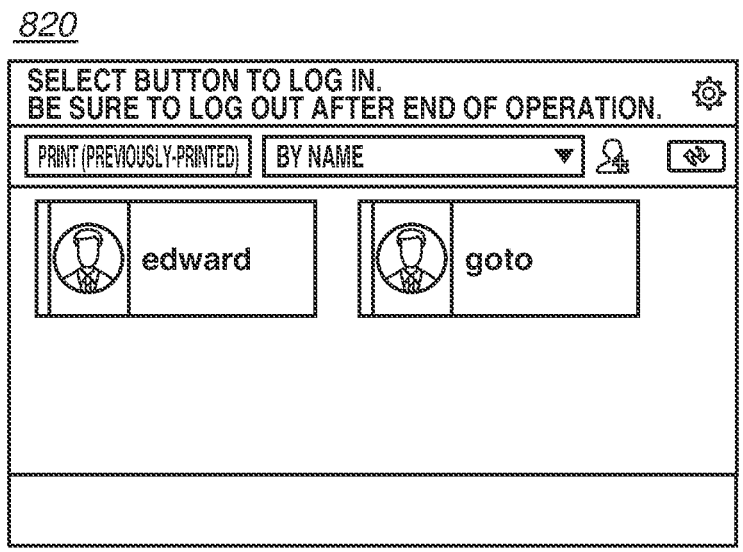
FIG. 8C is a diagram illustrating a previously-printed filter result.

FIG. 8C is a diagram illustrating a previously-printed filter result. In the previously-printed filter, the icons of the users having a job of the status "previously-printed" registered in the bibliographic information database 600 are displayed. The users having a "previously-printed" job registered in the bibliographic information database 600 are "edward" and "goto". Thus, the display area 713 displays the user icons "edward" and "goto" on a previously-printed filter screen 820.

[Process of Print Instruction Processing]

Figure 9:
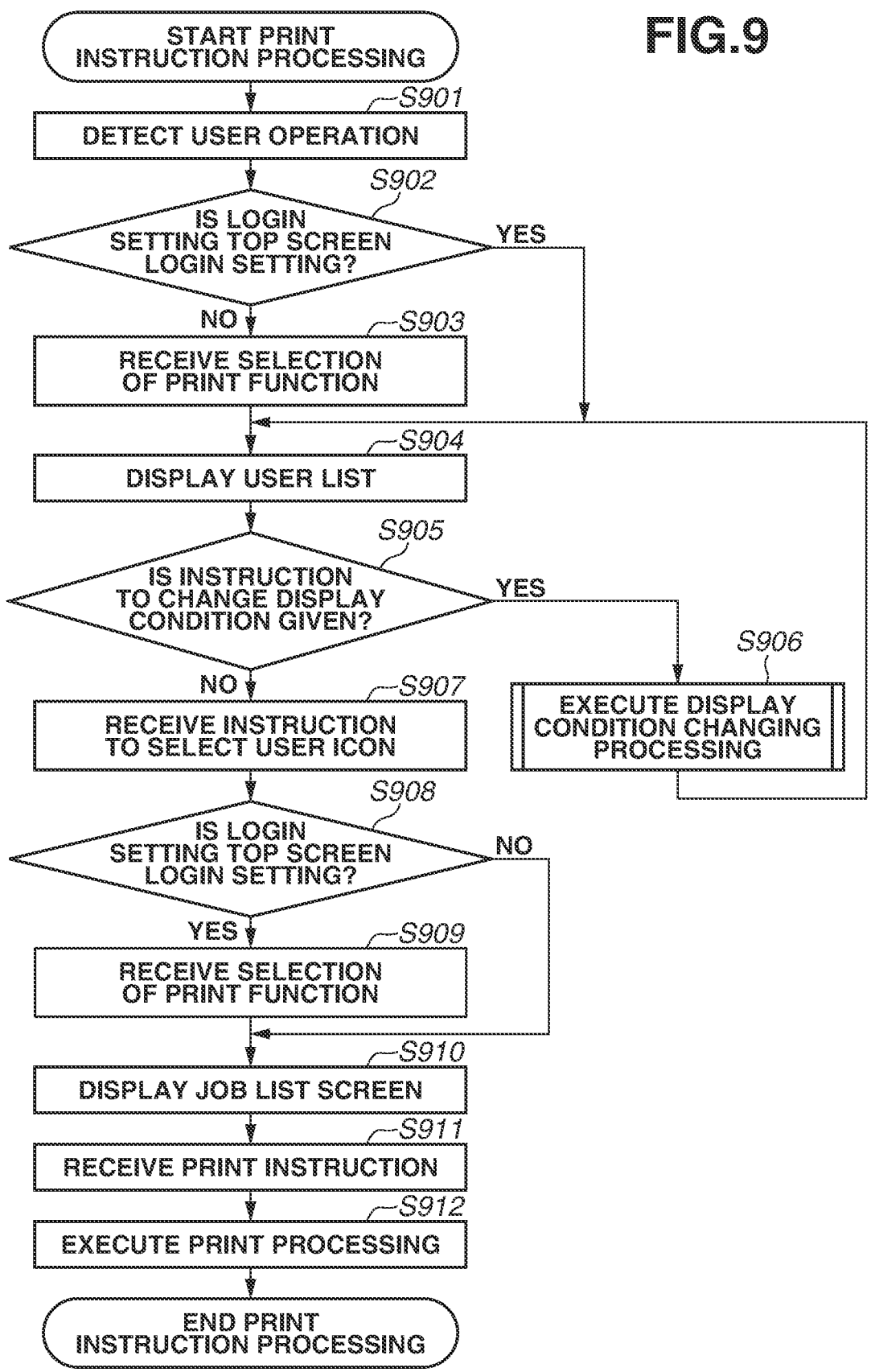
FIG. 9 is a flowchart illustrating a process of print instruction processing according to one or more aspects of the present disclosure.

A process from detection of a user operation by the printer 102 to execution of print processing will be described. FIG. 9 is a flowchart illustrating print instruction processing.

In step S901, if the operation panel 305 is operated by the user, the controller 300 detects the user operation. Then, in step S902, the controller 300 reads the login setting and determines whether the login setting is the top screen login setting. If the login setting is the top screen login setting (YES in step S902), the processing proceeds to step S904. If the login setting is not the top screen login setting (NO in step S902), the controller 300 displays the menu screen 700 on the display unit 305*b*. Then, in step S903, the controller 300 receives the selection of the personal print button 702 (print function) by the user operation.

In step S904, the controller 300 displays the user selection screen 710 (user list) on the display unit 305*b*. Next, the controller 300 determines whether an instruction to change the user icon display condition is given. If an instruction to change the user icon display condition is given, i.e., if the filter tab 711 or the sort tab 712 is selected, the controller 300 determines that an instruction to change the user icon display condition is given (YES in step S905). Then, in step S906, the controller 300 executes display condition changing processing. In step S904, after the display condition is changed, the controller 300 updates the user selection screen 710.

On the other hand, if no instruction to change the display condition is given (NO in step S905) but an instruction to select a user icon is received in step S907, then in step S908, the controller 300 determines whether the setting is the top screen login setting. If the setting is the top screen login setting (YES in step S908), the controller 300 displays the menu screen 700 on the display unit 305*b*. Then, in step S909, the selection of the personal print button 702 (print function) by the user operation is received. On the other hand, if the setting is not the top screen login setting (NO in step S908), the processing proceeds to step S910. Accordingly, the print function is selected in either step S903 or S909.

In step S910, the controller 300 displays the instruction screen 720 (job list screen) on the display unit 305*b*. Then, in step S911, the controller 300 receives a print instruction by receiving the selection of a job from the job list 721 and the selection of the print start button 724. If the print instruction is received, the controller 300 causes the print mechanism 307 to execute image forming based on the selected print job. In this way, the process is ended.

[Process of Display Condition Changing Processing]

Figure 10:
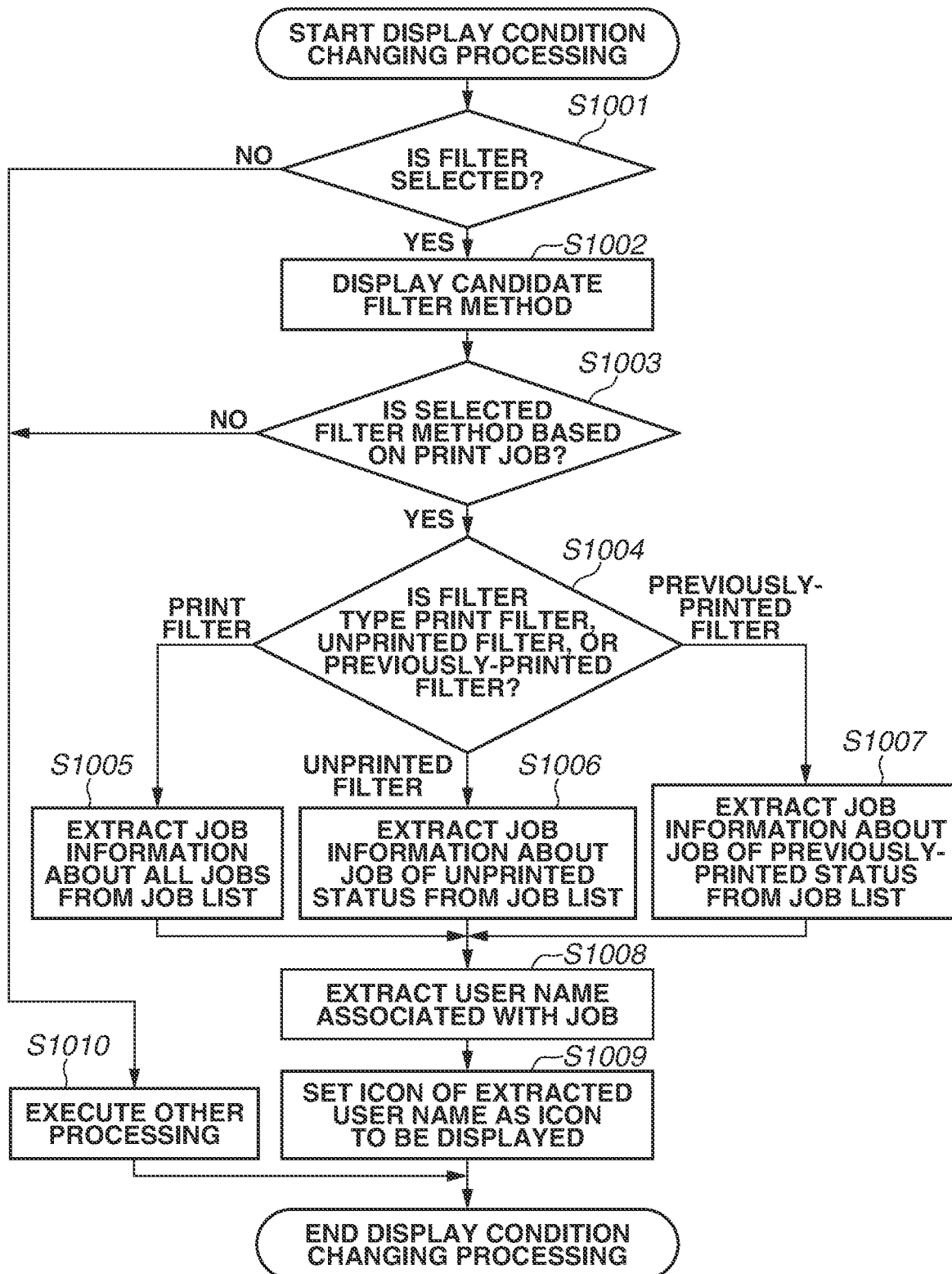
FIG. 10 is a flowchart illustrating a process of display condition changing processing according to one or more aspects of the present disclosure.

Next, details of a process of display condition changing processing in step S906 will be described below. FIG. 10 is a flowchart illustrating the process of display condition changing processing. The display condition changing processing is executed by the controller 300 which functions as the list management unit 323.

In step S1001 in the process of display condition changing processing, the controller 300 determines a change instruction method.

If the change method is not a filter (NO in step S1001), for example, if the sort tab 712 is selected, other processing is executed. In the present exemplary embodiment, the changing processing by the filter will be described, and description of the other processing in step S1010 is omitted.

If the change method is the filter (YES in step S1001), i.e., if the filter tab 711 is selected, then in step S1002, the controller 300 displays candidate filter methods on the display unit 305*b*. In step S1003, if a filter method is selected from the filter candidates, the controller 300 determines whether the selected filter method is a filter method based on print jobs. If the selected filter method is not a filter method based on print jobs (NO in step S1003), then in step S1010, the other processing is executed. If the selected filter method is a filter method based on print jobs (YES in step S1003), then in step S1004, the filter type is determined.

If the filter type is a print filter (PRINT FILTER in step S1004), then in step S1005, job information about all the jobs is extracted from the job list. If the filter type is the unprinted filter (to-be-printed filter) (UNPRINTED FILTER in step S1004), then in step S1006, job information about a job of the unprinted status is extracted from the job list. If the filter type is the previously-printed filter (PREVIOUSLY-PRINTED FILTER in step S1004), then in step S1007, job information about a job of the previously-printed status is extracted from the job list. Then, in step S1008, the controller 300 extracts the user name associated with the extracted job. Then, the controller 300 sets the icon of the extracted user name as an icon to be displayed. In this way, the process of display condition changing processing is performed.

[Advantage]

The present exemplary embodiment allows the user icons to be displayed by filtering users having print jobs. Thus, the user attempting to print a print job stored in the printer 102 can efficiently find the user icon of the user.

The present exemplary embodiment allows the user icons to be displayed by filtering the users by the condition "users having an unprinted print job". Thus, the user attempting to print an unprinted job stored in the printer 102 can efficiently find the user icon of the user.

The present exemplary embodiment allows the user icons to be displayed by filtering the users by the condition "users having a previously-printed print job". Thus, the user attempting to print a previously-printed job stored in the printer 102 can efficiently find the user icon of the user.

In the first exemplary embodiment, the example in which the user icons are filtered is described. In a second exemplary embodiment, an example in which the user icons are sorted will be described. The basic configuration of the print system according to the second exemplary embodiment is similar to the basic configuration of the print system according to the first exemplary embodiment except for a part of the configuration. Thus, components similar to those in the first exemplary embodiment are given the same reference numerals, and description thereof is omitted.

[Aggregated Database]

In the first exemplary embodiment, the jobs are extracted from the bibliographic information database 600 to filter the users. In the second exemplary embodiment, an aggregated database 1110 of the number of print jobs aggregated based on bibliographic information (not illustrated) different from the bibliographic information database 600 is used.

FIG. 11A is a diagram illustrating the configuration of the aggregated database 1110. The aggregated database 1110 includes a user name column 1111, a number-of-unprinted-jobs column 1112, a number-of-previously-printed-jobs column 1113, and a total-number-of-jobs column 1114. The user name column 1111 stores identification information about the users associated with the print jobs. The number-of-unprinted-jobs column 1112 stores the number of unprinted print jobs associated with the users. The number-of-previously-printed-jobs column 1113 stores the number of previously-printed print jobs associated with the users. The total-number-of-jobs column 1114 stores the number of print jobs associated with the users. In FIG. 11A, the aggregated database 1110 is sorted by user name.

FIG. 11B is a diagram illustrating a result of sorting the aggregated database 1110 by the number of print jobs. FIG. 12A is a diagram illustrating a result of sorting the aggregated database 1110 by the number of unprinted jobs. FIG. 12B is a diagram illustrating a result of sorting the aggregated database 1110 by the number of previously-printed jobs.

In a sort-by-number-of-print-jobs result 1120, data is arranged in descending order of the number of print jobs associated with the user. In a sort-by-number-of-unprinted-jobs result 1210, data is arranged in descending order of the number of unprinted jobs associated with the user. In a sort-by-number-of-previously-printed-jobs result 1220, data is arranged in descending order of the number of previously-printed jobs associated with the user.

[Display Screen]

Figures 14A, 14B:
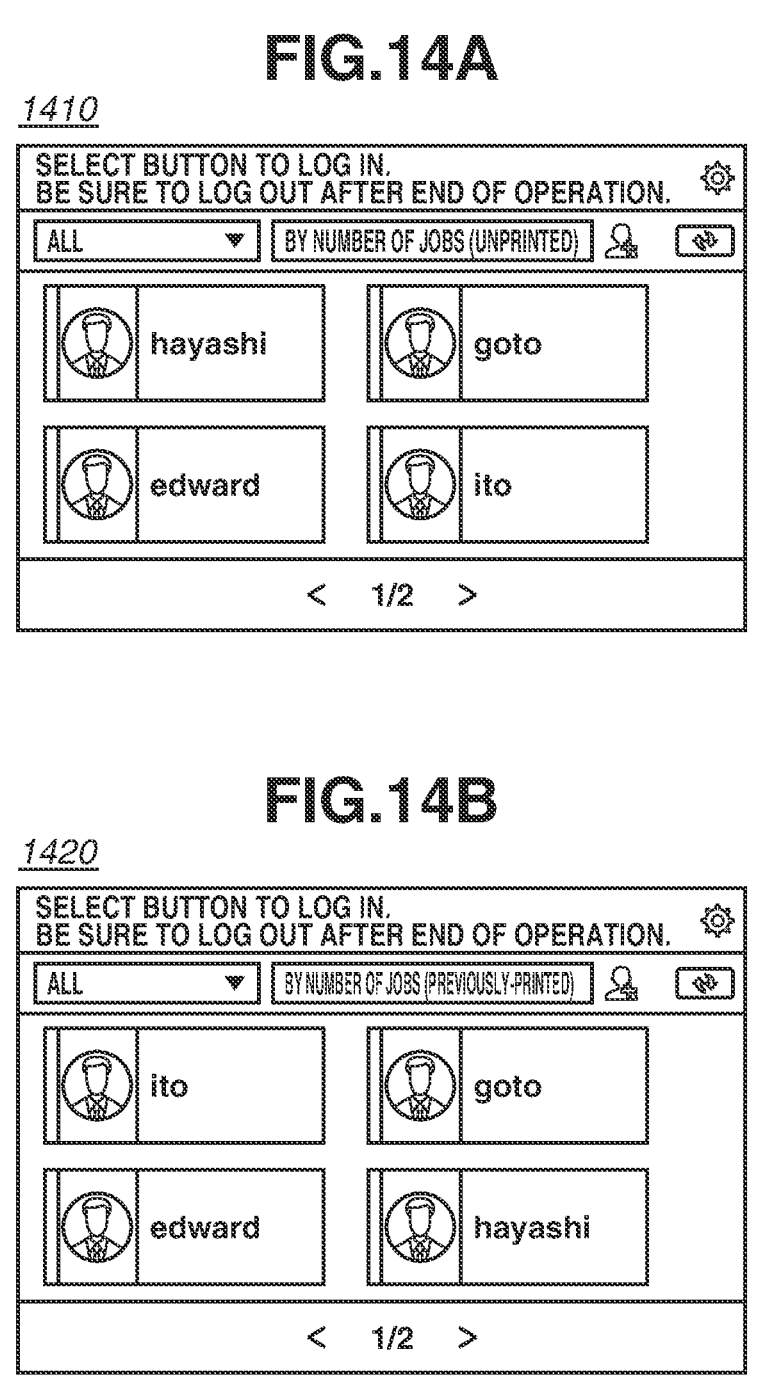

Next, a screen displayed on the display unit 305*b* in the second exemplary embodiment will be described. FIG. 13A is a diagram illustrating a sort tab. FIG. 14A is a diagram illustrating a sort by the number of unprinted jobs. FIG. 14B is a diagram illustrating a sort by the number of previously-printed jobs.

If the sort tab 712 is selected on the user selection screen 710, the controller 300 changes the user selection screen 710 to a sort tab selected state 1310. Examples of a candidate sort method include a sort by name, a sort by the number of print jobs, a sort by the number of unprinted jobs, and a sort by the number of previously-printed jobs. In the present exemplary embodiment, the user icon arrangement priority in the display area 713 is the upper left, the upper right, the lower left, and the lower right in this order. Thus, in the case of the sort by name, the controller 300 arranges "administrator", "edward", "goto", and "hayashi" in the upper left, the upper right, the lower left, and the lower right in this order based on the aggregated database 1110 (sort-by-name result). On the second page is arranged "ito". Alternatively, any other method of arrangement priority can be used. Further, the layout of the user icons is not limited to 2×2 and can be designed as appropriate, such as 1×4 or 3×3.

If the sort by the number of print jobs is selected from the sort tab 712, the controller 300 displays on the display unit 305*b* a number-of-print-jobs sort screen 1320 based on the sort-by-number-of-print-jobs result 1120. At this time, "goto", "ito", "hayashi", and "edward" are arranged on the first page and "administrator" on the second page in the display area 713.

If the sort by the number of unprinted jobs is selected from the sort tab 712, the controller 300 displays a number-of-unprinted-jobs sort screen 1410 on the display unit 305*b* based on the sort-by-number-of-unprinted-jobs result 1210. At this time, "hayashi", "goto", "edward", and "ito" are arranged on the first page and "administrator" on the second page in the display area 713. At this time, "ito" having no unprinted print job is arranged at a position remote from "hayashi" than "goto" and "edward". Further, "administrator" having no print job is arranged at a position remote from "hayashi" than "ito", "goto", and "edward".

If the sort by the number of previously-printed jobs is selected from the sort tab 712, the controller 300 displays a number of previously-printed jobs sort screen 1420 on the display unit 305*b* based on the sort-by-number-of-previously-printed-jobs result 1220. At this time, "ito", "goto", "edward", and "hayashi" are arranged on the first page and "administrator" on the second page in the display area 713. At this time, "hayashi" having no previously-printed print job is arranged at a position remote from "ito" than "goto" and "edward". Further, "administrator" having no print job is arranged at a position remote from "ito" than "hayashi", "goto", and "edward".

[Process of Display Condition Changing Processing]

Figure 18:
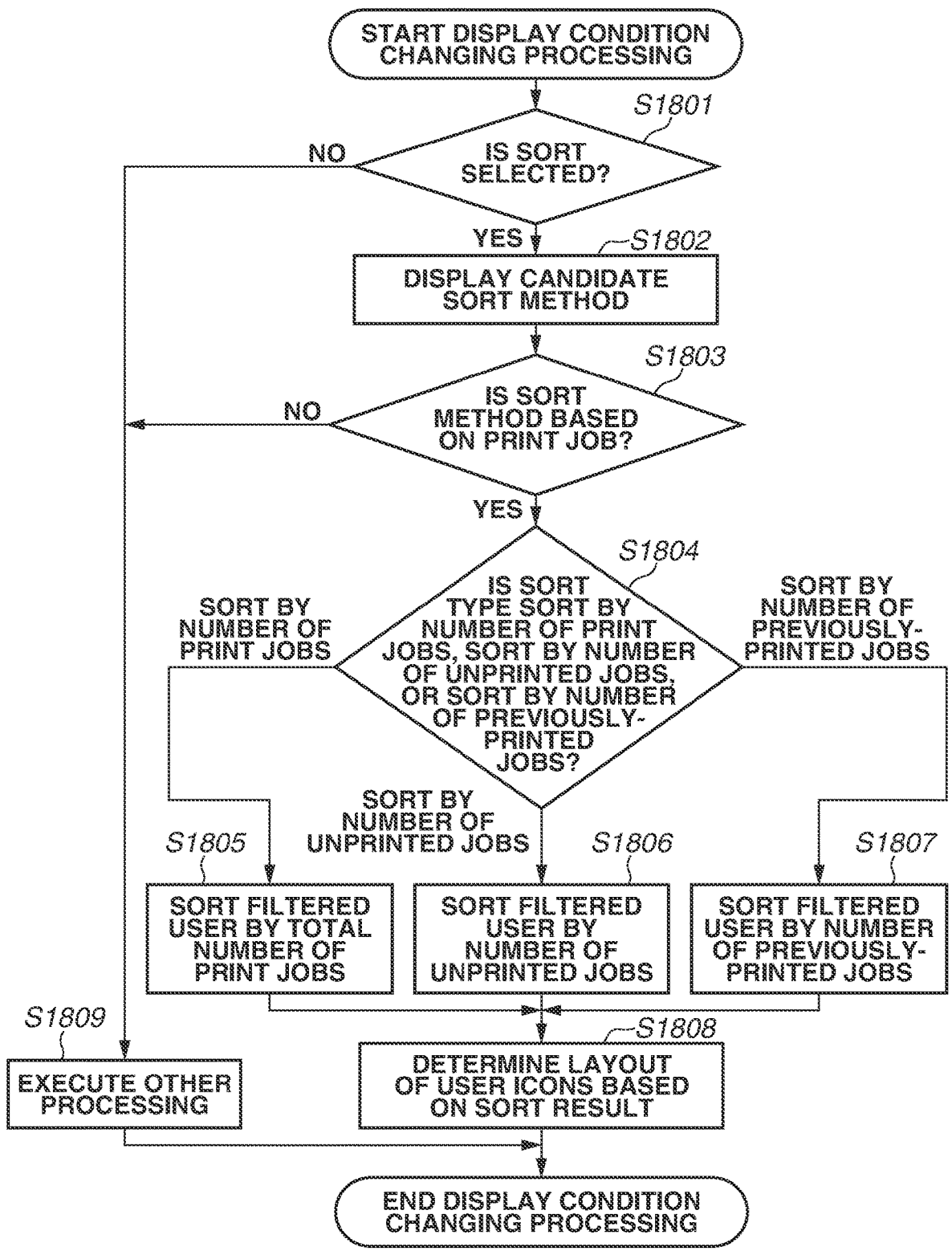
FIG. 18 is a flowchart illustrating a process of display condition changing processing according to one or more aspects of the present disclosure.

Next, details of the process of display condition changing processing in step S906 will be described. FIG. 18 is a flowchart illustrating the process of display condition changing processing. The display condition changing processing is executed by the controller 300 which functions as the list management unit 323.

In step S1801 in the process of display condition changing processing, the controller 300 determines the change instruction method.

If the change method is not a sort (NO in step S1801), e.g., if the filter tab 711 is selected, then in step S1809, other processing is executed. In the present exemplary embodiment, the changing processing by the sort will be described, and description of the other processing in step S1809 is omitted.

If the change method is a sort (YES in step S1801), i.e., if the sort tab 712 is selected, then in step S1802, the controller 300 displays candidate sort methods on the display unit 305*b*. If a sort method is selected from the candidate sort methods, then in step S1803, the controller 300 determines whether the selected sort method is a sort method based on print jobs. If the selected sort method is not a sort method based on print jobs (NO in step S1803), then in step S1809, the other processing is executed. If the selected sort method is a sort method based on print jobs (YES in step S1803), then in step S1804, the sort type is determined.

If the sort type is a sort by the number of print jobs (SORT BY NUMBER OF PRINT JOBS in step S1804), then in step S1805, the users in the filter are sorted by the number of print jobs and, for example, the sort-by-number-of-print-jobs result 1120 is acquired. If the sort type is the unprinted sort (to-be-printed sort) (SORT BY NUMBER OF UNPRINTED JOBS in step S1804), then in step S1806, the users in the filter are sorted by the number of unprinted jobs and, for example the sort-by-number-of-unprinted-jobs result 1210 is acquired. If the sort type is the previously-printed sort (SORT BY NUMBER OF PREVIOUSLY-PRINTED JOBS in step S1804), then in step S1807, the users in the filter are sorted by the number of previously-printed jobs and, for example, the sort-by-number-of-previously-printed-jobs result 1220 is acquired.

Then, in step S1808, the controller 300 determines the layout of the user icons based on the sort result.

In this way, the process of display condition changing processing is ended.

[Counting the Number of Print Jobs]

Figure 15:
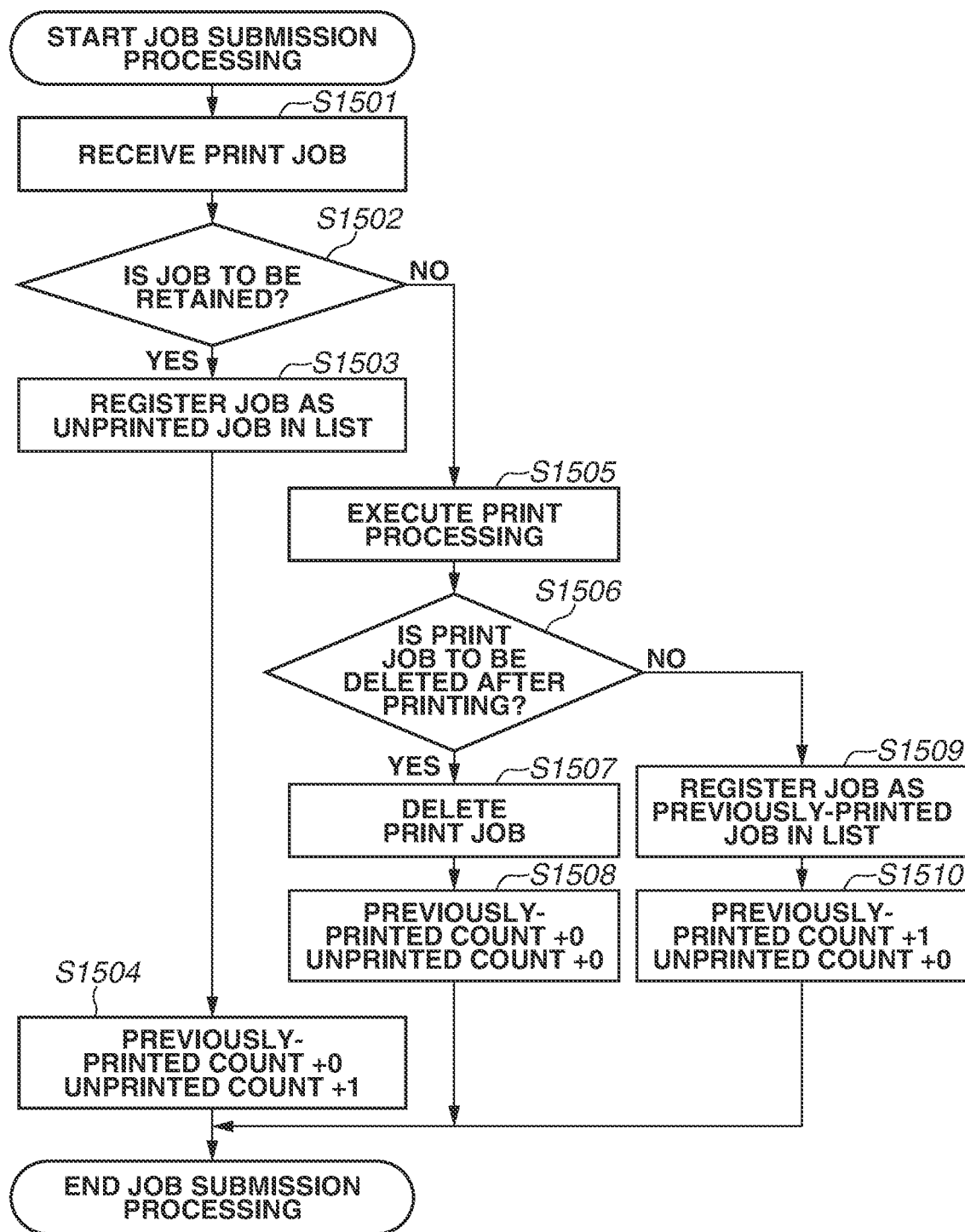
FIG. 15 is a flowchart illustrating a process of job submission processing according to one or more aspects of the present disclosure.
Figure 16:
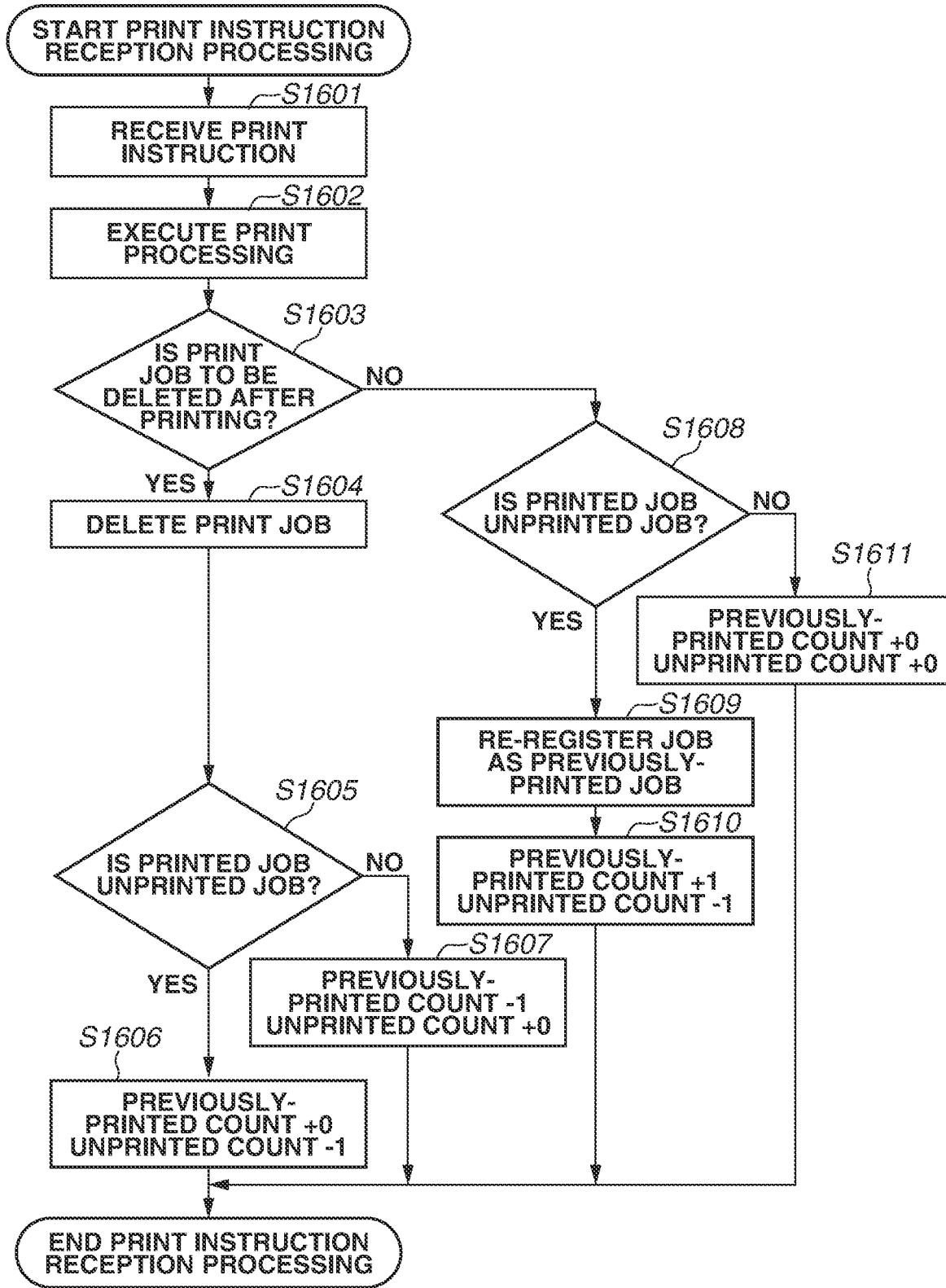
FIG. 16 is a flowchart illustrating a process of print instruction reception processing according to one or more aspects of the present disclosure.
Figure 17:
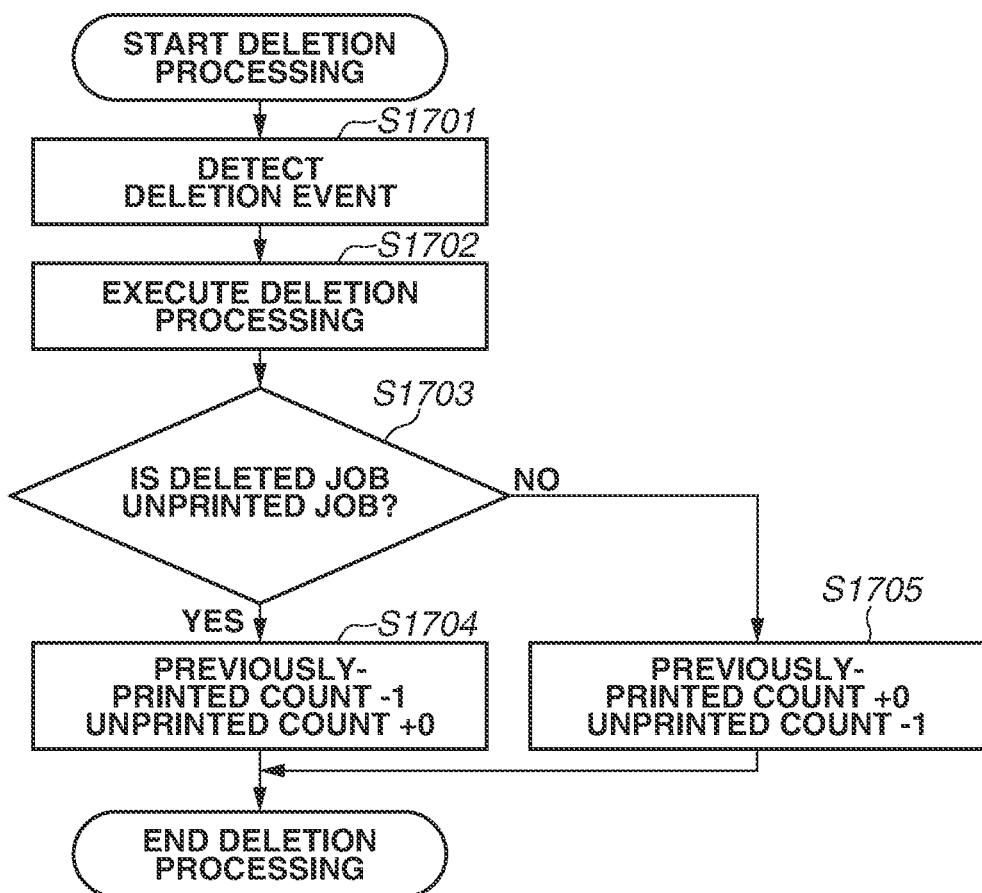
FIG. 17 is a flowchart illustrating a process of deletion processing according to one or more aspects of the present disclosure.

The counting of the number of print jobs to generate the aggregated database 1110 will be described. FIG. 15 is a flowchart illustrating a process of counting the number of print jobs which is involved in the job submission processing. FIG. 16 is a flowchart illustrating a process of counting the number of print jobs which is involved in the print instruction reception processing. FIG. 17 is a flowchart illustrating a process of counting the number of print jobs which is involved in the deletion processing.

First, the process of counting the number of print jobs which is involved in the job submission processing will be described below. In step S1501 in the job submission processing, the controller 300 first receives a print job. Then, in step S1502, the controller 300 determines whether the received job is a job to be retained.

If the print job is to be retained (YES in step S1502), then in step S1503, the received job is registered as an unprinted job in the bibliographic information database 600. Then, in step S1504, the unprinted count of the user associated with the received job is changed by "+1" in the aggregated database 1110.

If the print job is not to be retained (NO in step S1502), then in step S1505, the controller 300 causes the print mechanism 307 to execute image forming based on the received job.

Then, the controller 300 determines whether to delete the print job. If deletion-after-printing is designated with respect to the print job, or if a deletion-after-printing mode is set to the printer 102 (YES in step S1506), then in step S1507, the print job is deleted. Then, in step S1508, the count of the number of jobs of the user in the aggregated database 1110 is not changed, and the process is ended.

If neither the deletion-after-printing is designated with respect to the print job nor the deletion-after-printing mode is set to the printer 102 (NO in step S1506), then in step S1509, the received job is registered as a previously-printed job in the bibliographic information database 600. Then, in step S1510, the previously-printed count of the user associated with the received job in the aggregated database 1110 is changed by "+1".

In this way, the process of counting the number of print jobs which is involved in the job submission processing is ended.

Next, the process of counting the number of print jobs which is involved in the print instruction reception processing will be described. In step S1601 in the print instruction reception processing, the controller 300 first receives a print instruction from the user via the operation panel 305. Then, in step S1602, the controller 300 causes the print mechanism 307 to execute printing based on the print job for which the print instruction is given.

Then, in step S1603, the controller 300 determines whether to delete the print job. If the print instruction is with the designation of deletion-after-printing, or if the deletion-after-printing mode is set to the printer 102 (YES in step S1603), then in step S1604, the controller 300 deletes the print job. Further, in step S1605, the controller 300 determines whether the print job for which the print instruction is given is an unprinted job. If the printed job is an unprinted job (YES in step S1605), then in step S1606, the controller 300 changes the unprinted count of the user associated with the printed job to "−1". If the printed job is previously-printed job (NO in step S1605), then in step S1607, the controller 300 changes the printed count of the user associated with the printed job by "−1".

If the print job is not to be deleted after the printing (NO in step S1603), then in step S1608, the controller 300 determines whether the print job for which the print instruction is given is a previously-printed job or unprinted job.

If the printed job is an unprinted job (YES in step S1608), the controller 300 re-registers the print job as a previously-printed job. Specifically, "unprinted" in the print status column 604 in the bibliographic information database 600 is rewritten to "previously-printed". Then, in step S1610, the unprinted count of the user associated with the printed job is changed by "−1" and the previously-printed count by "+1".

If the printed job is a previously-printed job (NO in step S1608), then in step S1611, the controller 300 does not change the job count of the associated with the printed job, and the process is ended.

Next, the process of counting the number of print jobs which is involved in the deletion processing will be described. In step S1701 in the deletion processing, the controller 300 detects a deletion event. The deletion event is different from the deletion-after-printing. For example, the deletion event is detected in a case where the user operating the operation panel 305 designates the print job deletion. Further, the deletion event is detected in a case where a predetermined time passes from the print job submission time. As to an automatic deletion after job submission, the job deletion timing can be set as appropriate, such as 1 hour, 6 hours, 12 hours, 24 hours, 1 week, or 1 month.

If such a deletion event is detected, then in step S1702, the controller 300 performs print job deletion processing. Further, in step S1703, the controller 300 determines whether the deleted print job is an unprinted job or a previously-printed job. If the deleted print job is an unprinted job (YES in step S1703), the previously-printed count of the user associated with the deleted print job is changed by "−1". If the deleted print job is a previously-printed job (YES in step S1703), the controller 300 changes the previously-printed count of the user associated with the deleted print job by "−1".

In this way, the process of counting the number of print job which is involved in the deletion processing is ended.

[Advantage]

The present exemplary embodiment allows the user icons to be displayed by sorting the users by the number of print jobs. Thus, the user attempting to print a print job stored in the printer 102 can efficiently find the user icon of the user.

The present exemplary embodiment allows the user icons to be displayed by sorting the users by the number of unprinted print jobs. Thus, the user attempting to print an unprinted print job stored in the printer 102 can efficiently find the user icon of the user.

The present exemplary embodiment allows the user icons to be displayed by sorting the users by the number of previously-printed print jobs. Thus, the user attempting to print a previously-printed print job stored in the printer 102 can efficiently find the user icon of the user.

While the first and second exemplary embodiments are described above as separate exemplary embodiments, the first and second exemplary embodiments can be combined. Specifically, the user filter and the user sort can be combined.

While the filter is applied to all the user icons when the filter is selected in the first exemplary embodiment, a predetermined specific user icon can be exempted from the application of the filter. For example, the icon of the user having administrative right, such as "administrator", can be displayed as an exception regardless of the presence/absence of an unprinted job/previously-print job. Similarly, a specific user icon can be excluded from the sort and arranged at a specific position.

In the first exemplary embodiment, a user icon having no unprinted job is hidden at the time of the filter by unprinted jobs. The filter method is not limited to this method. A user icon having no unprinted job can be masked (grayed out).

While the user is associated with the print job by adding a user ID to the print data in the first exemplary embodiment, the method of associating a user with a print job is not limited to the above-described method. For example, the user and a specific box (folder) can be associated in advance, and a print job based on data stored in the specific box can be treated as a print job associated with the user.

The present disclosure can also be realized by a process in which a program for realizing one or more functions of the above-described exemplary embodiments is supplied to a system or apparatus via a network or storage medium and then one or more processors of a computer of the system or apparatus is caused to read and execute the program. Further, the present disclosure can also be realized by a circuit (e.g., application-specific integrated circuit (ASIC)) which realizes one or more functions.

Further, the present disclosure is applicable to a system including a plurality of devices or an apparatus including a single device.

The present disclosure provides an image forming apparatus with great usability for the users using print data.

The present disclosure is not limited to the above-described exemplary embodiments and can be modified (including organic combinations of the exemplary embodiments) in various ways based on the spirit of the present disclosure, and such modifications are not excluded from the scope of the present disclosure. Specifically, every combination of the above-described exemplary embodiments and modified examples thereof is encompassed within the scope of the present disclosure.

Embodiments of the present disclosure can also be realized by a computer of a system or apparatus that reads out and executes computer executable instructions recorded on a storage medium (e.g., non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

What is claimed is:

1. An image forming apparatus comprising:
   a printer configured to print an image on a printing medium by a print job being executed,
   a display configured to display a plurality of objects each corresponding to a different one of users and based on each of which the image forming apparatus performs user authentication for the corresponding user, and
   a controller configured to execute a print job corresponding to an authenticated user,
   wherein the controller is further configured to cause the display to switchably display a first screen or a second screen, the first screen being for displaying the plurality of objects in a selectable manner regardless of whether each of the plurality of the objects is an object based on which the image forming apparatus performs the user authentication for a user corresponding to a print job held in the image forming apparatus or not, and the second screen being for displaying, among the plurality of objects, an object based on which the image forming apparatus performs the user authentication for only a user corresponding to a print job which is held in the image forming apparatus and which has not yet been subject to execution of printing by the printer.

2. The image forming apparatus according to claim 1, wherein the second screen does not display an object based on which the image forming apparatus performs the user authentication for a user corresponding to a print job which is held in the image forming apparatus and which has been subject to execution of printing by the printer and not corresponding to a print job which is held in the image forming apparatus and which has not yet been subject to execution of printing by the printer.

3. The image forming apparatus according to claim 1, wherein the second screen displays an object based on which the image forming apparatus performs the user authentication for a user corresponding to a print job which is held in the image forming apparatus and which has been subject to execution of printing by the printer and corresponding to a print job which is held in the image forming apparatus and which has not yet been subject to execution of printing by the printer.

4. The image forming apparatus according to claim 1, wherein the second screen displays an object based on which the image forming apparatus performs the user authentication for a user corresponding to a print job which is held in the image forming apparatus and which has not yet been subject to execution of printing by the printer and not corresponding to a print job which is held in the image forming apparatus and which has been subject to execution of printing by the printer.

5. The image forming apparatus according to claim 1, wherein the first screen displays all the plurality of objects in a selectable manner.

6. The image forming apparatus according to claim 1, wherein the controller is further configured to cause the display to display either the first screen or the second screen in accordance with a display target selected on the display.

7. The image forming apparatus according to claim 1, wherein the controller is further configured to cause the display to display the second screen in a case where a filter for sorting a user corresponding to a print job which has not yet been subject to execution of printing by the printer is selected.

8. The image forming apparatus according to claim 1, wherein the controller is further configured to cause the display to further switchably display a third screen for only displaying an object based on which the image forming apparatus performs the user authentication for a user corresponding to a print job which is held in the image forming apparatus and which has been subject to execution of printing by the printer and not corresponding to a print job which has not yet been subject to execution of printing by the printer.

9. The image forming apparatus according to claim 8, wherein the controller is further configured to cause the display to display the third screen in a case where a filter for sorting a user corresponding to a print job which has been subject to execution of printing by the printer is selected.

10. The image forming apparatus according to claim 1, wherein the controller is further configured to perform user authentication for a user corresponding to an object selected from among the plurality of objects and, in a case where the user authentication succeeds, allow the corresponding user to log in to the image forming apparatus.

11. The image forming apparatus according to claim 1, wherein the controller is further configured to, in a case where the user authentication for the user corresponding to the print job which is held in the image forming apparatus and which has not yet been subject to execution of printing by the printer succeeds, display the print job corresponding to the authenticated user in a selectable manner.

* * * * *